United States Patent
Hartnell

(10) Patent No.: US 8,905,327 B2
(45) Date of Patent: Dec. 9, 2014

(54) DEVICE FOR CLEANING VEHICLE SURFACES

(75) Inventor: Paul Hartnell, Aberdare (GB)

(73) Assignee: Kautex Textron CVS Limited, Mid Glamorgan (GB)

( * ) Notice: Subject to any disclaimer, the term of this patent is extended or adjusted under 35 U.S.C. 154(b) by 945 days.

(21) Appl. No.: 13/063,034

(22) PCT Filed: Sep. 9, 2008

(86) PCT No.: PCT/EP2008/007368
§ 371 (c)(1),
(2), (4) Date: May 31, 2011

(87) PCT Pub. No.: WO2010/028661
PCT Pub. Date: Mar. 18, 2010

(65) Prior Publication Data
US 2011/0215173 A1    Sep. 8, 2011

(51) Int. Cl.
*B05B 1/10* (2006.01)
*B05B 7/32* (2006.01)
*B05B 15/10* (2006.01)
*B60S 1/46* (2006.01)
*B60S 1/02* (2006.01)
*F16K 17/04* (2006.01)
*B60S 1/52* (2006.01)

(52) U.S. Cl.
CPC ............ *F16K 17/0493* (2013.01); *B60S 1/528* (2013.01)
USPC ...... 239/284.1; 239/205; 239/337; 239/533.1; 15/250.01

(58) Field of Classification Search
CPC ............ B05B 1/10; B05B 7/32; B05B 15/10; B60S 1/46; B60S 1/02; F23D 11/24; F23D 14/28; F23D 14/34

USPC ................ 239/284.1, 284.2, 337, 533.1, 205; 15/250.01–250.05
See application file for complete search history.

(56) References Cited

U.S. PATENT DOCUMENTS 2,881,801 A  *  4/1959  McCormick ............... 137/270.5
3,079,946 A     3/1963  Rosler
(Continued)

FOREIGN PATENT DOCUMENTS

| DE | 4329405 | 3/1994 |
| JP | 06032206 | 2/1994 |
| JP | 2004050079 | 2/2004 |

OTHER PUBLICATIONS

International Search Report dated Aug. 5, 2009 received in corresponding Application No. PCT/EP2008/007368.
(Continued)

*Primary Examiner* — Justin Jonaitis
(74) *Attorney, Agent, or Firm* — Grossman Tucker Perreault & Pfleger, PLLC

(57) ABSTRACT

The invention refers to a headlamp cleaning device comprising at least one nozzle carrier (7) for mounting on a cleaning liquid supply tube (4a, 4b), the nozzle carrier (7) defining at least one cleaning liquid supply conduit (8) for a pressurized cleaning fluid and being provided with at least one cleaning fluid distribution chamber (13), said chamber communicating with said cleaning liquid supply conduit (8) and with at least one spray nozzle (9) mounted on said nozzle carrier (7), wherein said distribution chamber (13) is provided with at least one inlet port (20) which in a non-pressurized state is closed by a fluid valve and wherein said fluid valve is designed as a springless valve.

7 Claims, 3 Drawing Sheets

(56) References Cited

U.S. PATENT DOCUMENTS

Figure 3:
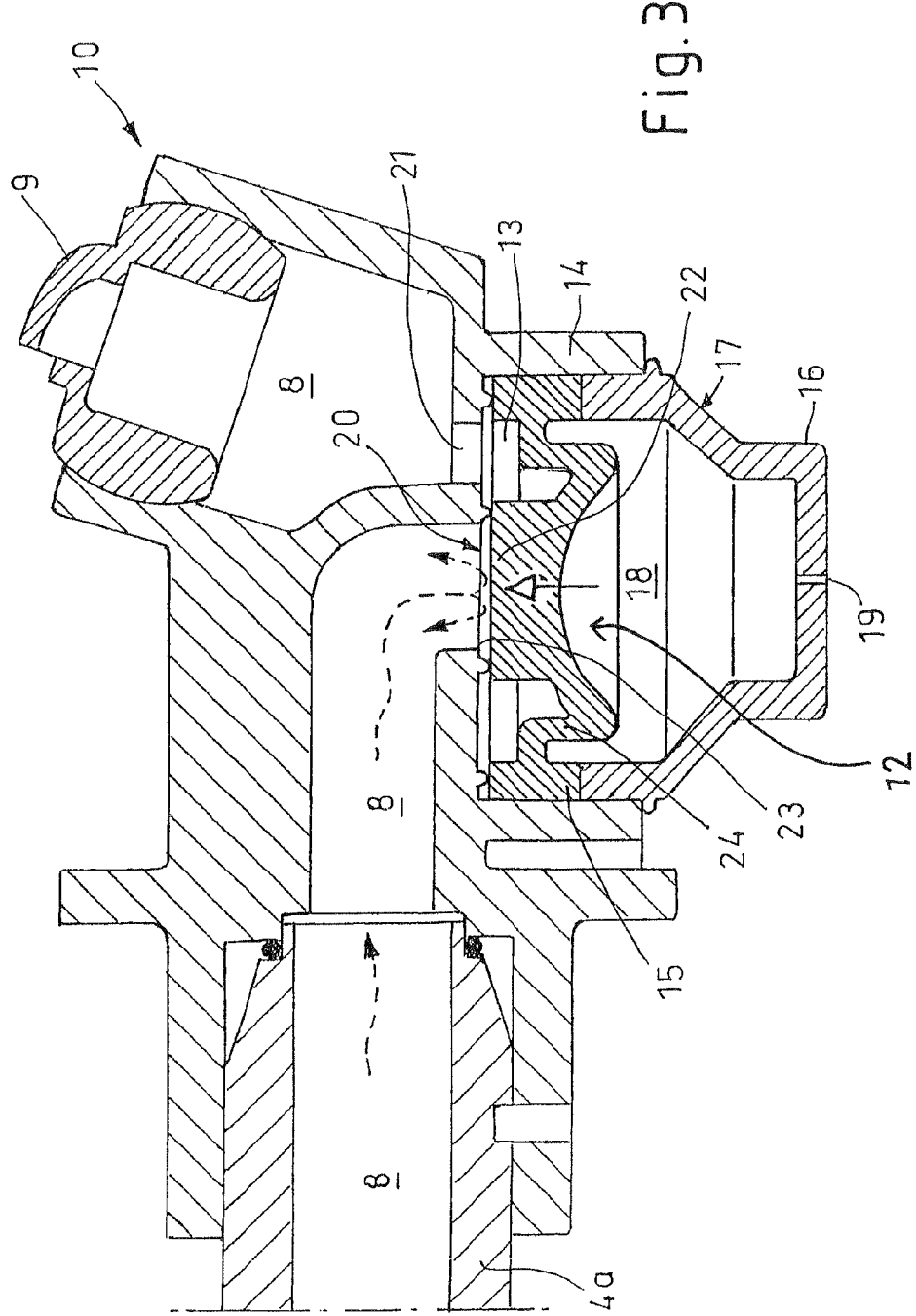

| | | | |
|---|---|---|---|
| 4,438,537 A * | 3/1984 | Bickle | 4/492 |
| 5,386,848 A | 2/1995 | Gilchrist et al. | |
| 5,605,286 A * | 2/1997 | Orth et al. | 239/284.2 |
| 6,186,156 B1 * | 2/2001 | Schlein | 134/105 |
| 6,752,329 B1 * | 6/2004 | Price | 239/284.2 |
| 6,951,223 B2 * | 10/2005 | Fukushima | 134/186 |
| 2004/0188541 A1 | 9/2004 | Maruyama | |
| 2005/0121539 A1 * | 6/2005 | Takada et al. | 239/284.2 |
| 2006/0114666 A1 | 6/2006 | Sakai et al. | |
| 2008/0210780 A1 * | 9/2008 | Discher et al. | 239/284.2 |

OTHER PUBLICATIONS

International Preliminary Report on Patentability/Written Opinion dated Mar. 24, 2011 received in corresponding Application No. PCT/EP2008/007368.

* cited by examiner

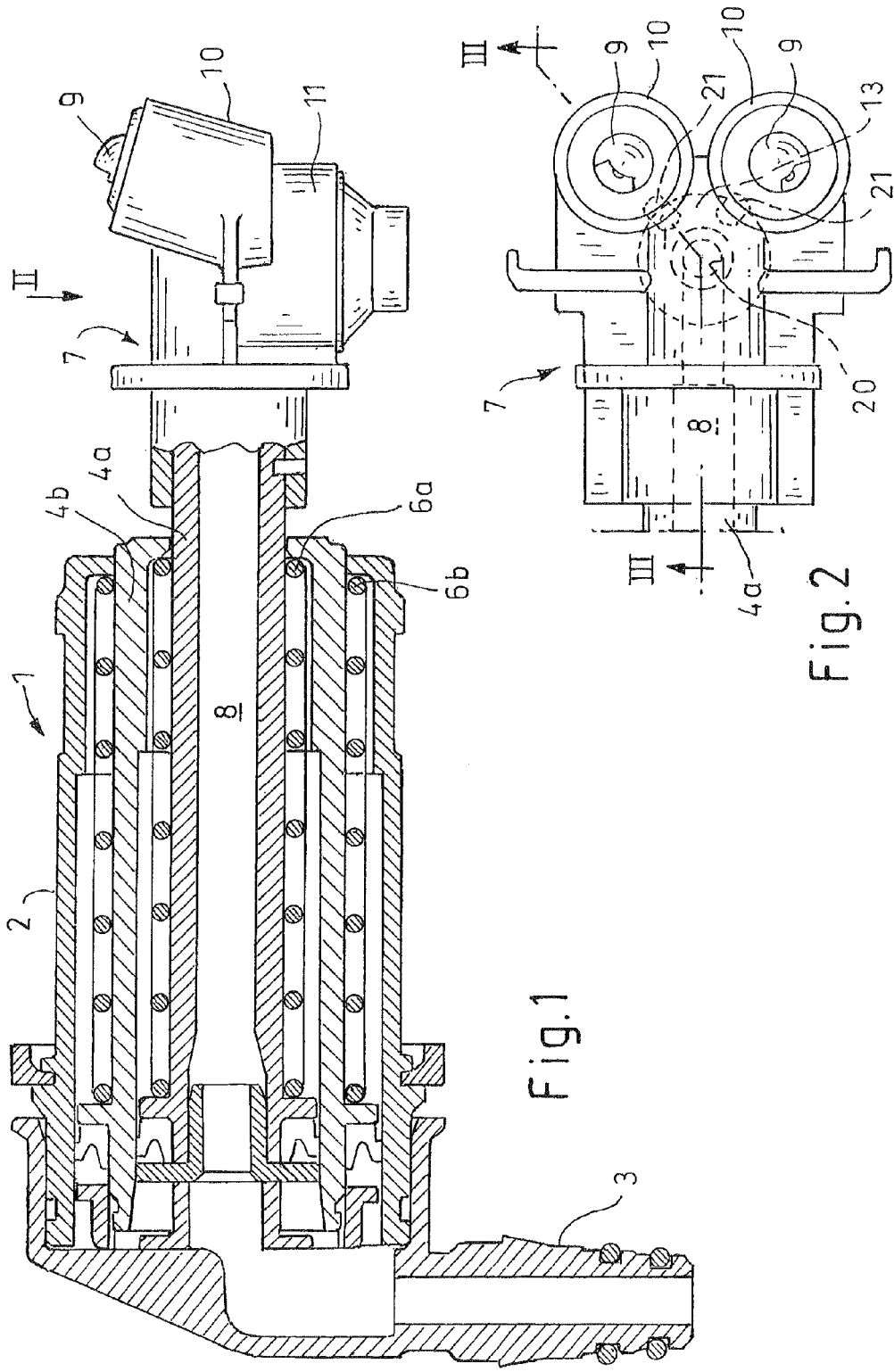

DEVICE FOR CLEANING VEHICLE SURFACES

The present invention refers to a device for cleaning vehicle surfaces such as headlamps. Windshield and headlamp cleaning devices are generally known in the art. Nowadays the cleaning devices are designed such that the surface to be cleaned is only cleaned by a jet of cleaning fluid which is discharged under pressure from one or more spray nozzles. The jet of cleaning fluid discharged from the spray nozzles is sufficiently energized to ensure a proper cleaning action. No additional mechanically operating cleaning means as wipers or the like are required to achieve a satisfying cleaning result.

Cleaning devices which are arranged in concealed fashion normally use the pressure of the cleaning fluid for extension movement of the nozzles which sometimes are fixed on a telescoping cylinder arrangement which is held in a retracted position by means of a return spring. Said cylinder arrangement can be hydraulically activated by the way of the pressure of the cleaning fluid, in which case firstly the pressure of the return spring acting on the cylinder has to be overcome upon extension of the spray nozzle by way of the pressure of the cleaning fluid.

Conventional designs of telescopic headlamp cleaning devices which use the pressure of the cleaning fluid for the extension movement of the nozzles require fluid valves establishing fluid communication with the spray nozzle once the nozzles are in the fully extended position. Such designs of headlamp cleaning devices known in the art for this purpose utilize spring biased non-return valves operated by the fluid pressure.

Accordingly cleaning devices utilizing so-called "pop-up nozzles" are expensive due to the number of moving parts required for controlling the extension movement of the nozzles.

However, also nozzle arrangements which are not hidden from external view sometimes require return valves, for instance when several nozzles are to be arranged in series and/or in parallel.

It is therefore an object of the present invention to provide a device for cleaning vehicle surfaces, particularly a headlamp cleaning device which is simple to manufacture and cost-effective.

It is furthermore an object of the present invention to provide a device for cleaning vehicle surfaces which has a reduced number of moving parts.

These and other objects are achieved by a device for cleaning vehicle surfaces such as headlamps, comprising at least one nozzle carrier for mounting on a cleaning liquid supply tube, the nozzle carrier defining at least one cleaning liquid supply conduit for a pressurized cleaning fluid and being provided with at least one cleaning fluid distribution chamber, said chamber communicating with said cleaning liquid supply conduit and with at least one spray nozzle mounted on said nozzle carrier, wherein said distribution chamber is provided with at least one inlet port which in a non-pressurized state is closed by a fluid valve and wherein said fluid valve is designed as a springless valve.

Springless in the sense of the present application means that the valve is designed such that an additional spring member, for instance a return spring as a coil spring, is not required anymore. Opening of the valve according to the invention is only achieved by positive fluid pressure being applied to its inlet side, and closure, which means return to the original position, is only achieved from resultant tensile forces stored within the material of a moving part of the fluid valve. Thus, the number of moving parts required for the design of the fluid valve is reduced.

In one advantageous embodiment the valve comprises a resilient diaphragm type sealing member.

Such sealing member may define a valve body which in a non-pressurized condition sealing engages a valve seat and may be disengaged from the valve seat by the pressure of the cleaning fluid.

A springless valve according to the invention can for instance be used to achieve a pressure build up within a cleaning device to a certain degree in order to utilize the pressure of the cleaning fluid for an extension movement of the nozzles. It is to be understood that the nozzle carrier according to the invention may be attached to a telescopic cylinder arrangement as well as to a pivot arm where the fluid pressure is used for shifting or rotating the pivot arm.

The diaphragm type sealing member of the fluid valve is preferably made by a resilient material (for instance EPDM or rubber) designed such that it flexes away from its sealing position upon pressure built up. Upon pressure release the sealing member may flex back into its initial sealing position where it sealingly engages a valve seat which may for instance only be the peripheral rim of a fluid port.

In one design variation the sealing member may comprise a cup-shaped diaphragm provided with a peripheral mounting flange, the diaphragm defining a substantially flat sealing surface yieldingly the engaging the sealing seat and being displaceable relative to the mounting flange upon the action of the fluid pressure.

It is particularly advantageous when the sealing member yieldingly has a single piece design, the peripheral mounting flange and the cup-shaped diaphragm being connected via a circumferential relatively thin-walled web of resilient material.

In one advantageous embodiment said distribution chamber comprises at least two cleaning fluid discharge openings each communicating with at least one spray nozzle.

The invention is only clearly to be understood such that the distribution chamber may also comprise one inlet port and one discharge port. In this event the distribution chamber only serves as a housing for a diaphragm type sealing member.

At least one spray nozzle, preferably all spray nozzles have an eye-ball design. "Eye-ball" design is a well-recognized term and describes a ball type nozzle body with a fluid discharge conduit extending therethrough, the discharge opening of the nozzle being designed as a circumferential cutout of the ball.

Preferably the spray nozzles are snap-fitted into the nozzle carrier.

One preferable embodiment of the device according to the invention is characterized by a retractable hollow cleaning liquid supply tube slidably arranged within an elongate housing connectable to a source of pressurized cleaning fluid and being biased in the retracted position, the nozzle carrier being attached to a distal end of the liquid cleaning supply tube.

Of course this telescopic cylinder arrangement may comprise more than one cylinder, each cylinder being biased by a spring coil in the retracted position, in order to increase the amount of extension.

Figure 4:
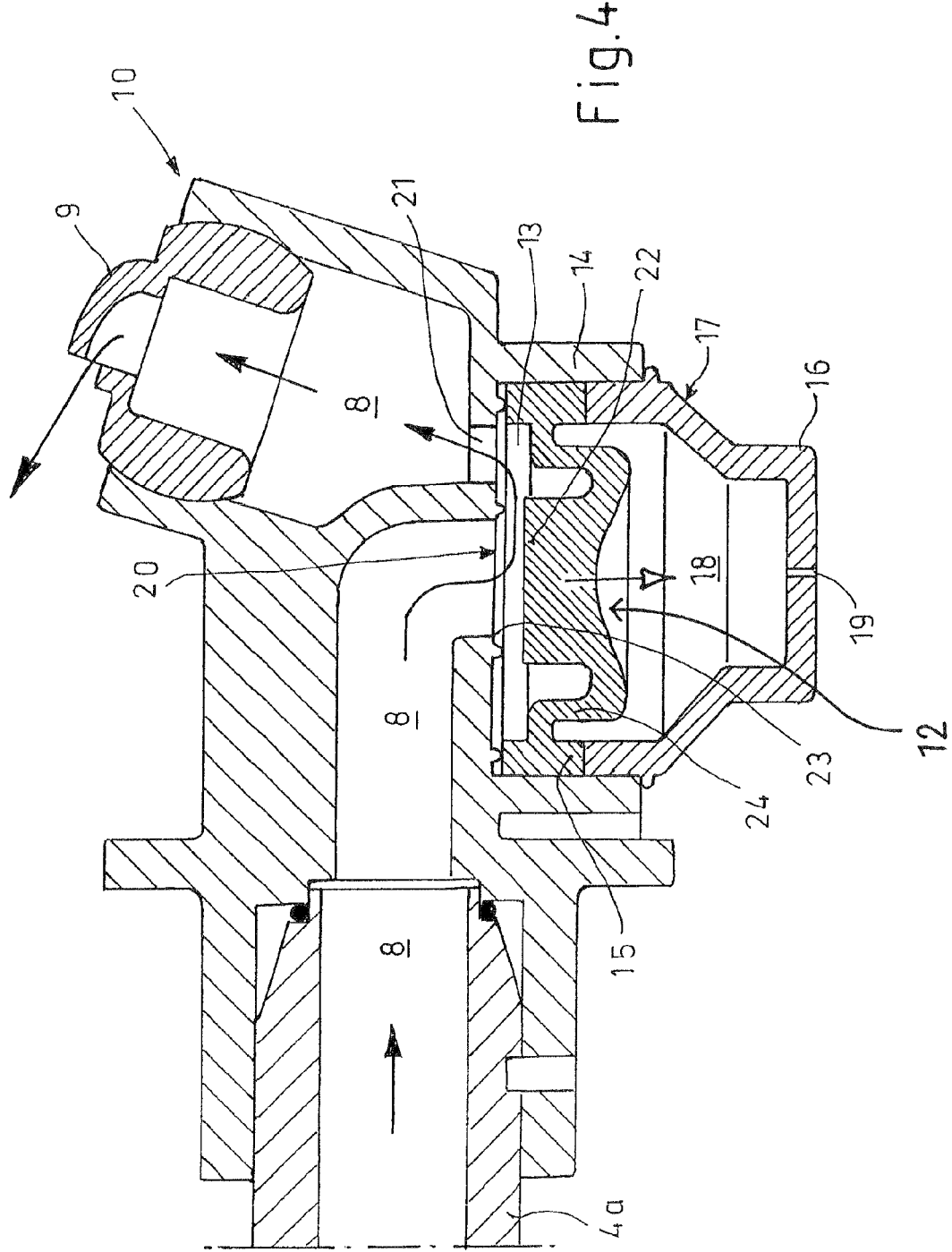

One advantageous embodiment of the cleaning device according to the invention is explained hereinafter by way of example with reference to the accompanying drawings in which:

FIG. 1 shows a side-elevational view of the cleaning device according to the invention, partly cut in longitudinal direction, FIG. 2 shows a top view of the nozzle carrier taken in the direction of the arrow II in FIG. 1, FIG. 3 shows a longitudinal section through the nozzle carrier taken along the line III-III in FIG. 2 where the fluid valve is in its closed position and FIG. 4 shows a longitudinal section according to the one shown in FIG. 3 where the fluid valve is in its closed position.

The cleaning device 1 according to the invention comprises an elongated cylindrical housing 2 with a fluid supply 3 connectable to a source of pressurized cleaning fluid (not shown) and two retractable hollow cleaning liquid supply tubes 4a and 4b slidably arranged within the housing 2. The fluid supply 3 is designed as a connector for receiving a hose fitted thereto. The hose in turn may be connected to an electrically operated cleaning liquid supply pump which is also not shown.

A cleaning device 1 as described hereinafter is designed as a headlamp cleaning device, however, the cleaning device may also be used a cleaning device for windshields or other vehicle surfaces to be cleaned.

The cleaning device 1 may be mounted at the structure of a vehicle in concealed fashion, for instance within the bumper of a car.

The cleaning liquid supply tubes 4a and 4b which are designed as hollow plastic tubes are slidably arranged within each other and within the housing 2, the outside diameter of the first (leading) liquid supply tube 4a being smaller than the inside diameter of the cleaning liquid supply tube 4b, the outside diameter of the cleaning liquid supply tube 4a (trailing tube) being in turn smaller than the inside diameter of the cylindrical housing 2.

FIG. 1 shows the telescopic cylinder arrangement formed by the housing 2 and the cleaning liquid supply tubes 4a, 4b in a retracted position. The liquid cleaning supply tube 4a is guided within the cleaning liquid supply tube 4b at its trailing end (proximal end) by peripheral flange 5b, whereas cleaning liquid supply tube 4b in turn is guided within housing 2 by a peripheral flange 5b at its trailing end. At the same time the flanges 5a and 5b serve as a support for two coil springs 6a and 6b yielding the biasing the cleaning liquid supply tubes 4a and 4b respectively in the retracted position. For sake of simplicity the extended position is not shown.

At the leading end (distal end) of the inner liquid supply tube 4a a nozzle carrier 7 is mounted. The nozzle carrier 7 is sealingly fitted on the leading end of the inner cleaning liquid supply tube 4a and in fluid communication therewith, the cleaning liquid supply tubes 4a and 4b as well as the nozzle carrier 7 defining a cleaning liquid conduit 8 for delivery of cleaning liquid the two spray nozzles 9 arranged at the distal end of the nozzle carrier 7.

The spray nozzles 9 are designed as eye-ball type nozzles which are snap-fitted into receiving holes 10 of the nozzle carrier 7. The receiving holes 10 having a circular cross section, the spray nozzles 9 being arranged within the receiving holes 10 in an adjustable fashion.

As this can be seen from FIG. 2 the receiving holes 10 and thus the spray nozzles 9 are arranged above a valve housing 11 (with reference to the position shown in the drawing). The valve housing 11 receives an elastically deformable sealing member 12 forming the bottom of a cleaning liquid distribution chamber 13.

The valve housing 11 comprises a peripheral surrounding wall 14 which extends circularly. The sealing member 12 is fitted into the valve housing 11, which accordingly has a disk-shaped contour.

As mentioned before, the sealing member 12 is made from a resilient material such as rubber, EPDM or the like and has a single-piece design.

As this can be taken from FIGS. 3 and 4 the sealing member 11 comprises a surrounding non-peripheral mounting flange 15 held in the valve housing 11 by a cup-shaped cover 16 which is snap-fitted in a receiving opening 17 of the nozzle carrier 7, the space between the sealing member 12 and the cover 16 is thereby defining a compensation volume 18 allowing displacement of the sealing member 12, as will be explained in detail hereinafter. For this purpose the compensation volume 18 is provided with a ventilation hole 19, as this can be seen from FIGS. 3 and 4.

The cleaning liquid conduit 8 communicates via a circular and central inlet port 20 with the distribution chamber 13. The spray nozzles 9 are also connected to the distribution chamber 13 via discharge ports 21 which are disposed radially outwardly relative to the inlet port 20 when referring to the top view in FIG. 2.

Referring again to the design of the sealing member 12, the sealing member has a central diaphragm type part which is cup-shaped in cross section and which forms a cylindrical valve body 22. In the closed and non-pressurized condition of the cleaning device the valve body 22, which forms a flat and disk-shaped sealing surface, sealingly engages a peripheral rim 23 of the inlet port 20. The circumferential rim 23 of the inlet port 20 defines a valve seat for engagement with the valve body 22. Due to the resilience of the material the valve body 22 is yieldingly held in its closed position. The valve body 22 is connected to its surrounding mounting flange 15 via a circumferential corrugated web 24, the material of the web being remarkably thinner than the material in the area of the valve body 22.

Once cleaning fluid under pressure is supplied, the pressure of the cleaning fluid causes displacement of the valve body 22 to the direction of the arrow shown in FIG. 4. Thereby the cup-shaped part of the diaphragm type sealing member 12 is flexed into the compensation volume 18, i.e. downwardly in FIG. 4, thereby opening the inlet port 20 and thereby allowing ingress of cleaning fluid into the distribution chamber 13. As the distribution chamber 13 communicates via discharge ports 21 with the spray nozzles 9, cleaning fluid is discharged onto the surface to be cleaned.

Upon ingress of the cleaning fluid via cleaning fluid supply 3 into the cleaning liquid supply tubes 4a and 4b internal pressure is built up due to the fact that initially the valve body 22 is in its closed position as this is shown in FIG. 3. When the pressure of the cleaning fluid raises, first and inner cleaning fluid supply tube 4a will be extended against the force of coil spring 5a. Once the cleaning liquid supply tube 4a abuts cleaning supply tube 4b the latter one also will make a forward extension movement until the second and outer cleaning liquid supply tube 4b abuts the leading end of housing 2. A further increase in static pressure acting on the valve body 22 causes displacement, i.e. flexing movement of the valve body 22 into the compensation volume 18 thereby discharging the air trapped in the compensation volume 18 via ventilation hole 19 and opening the inlet port 20. Upon pressure release the valve body 22 will flex back into its initial position due to the tensile forces stored within the material of the sealing member 11.

The design is simple to manufacture and has the least amount of moving parts.

REFERENCE NUMERALS 1 cleaning device
2 housing 3 fluid supply
4a first and inner liquid supply tube
4b second and outer liquid supply tube
5a, 5b flanges
6a, 6b coil springs
7 nozzle carrier
8 cleaning liquid conduit
9 spray nozzles
10 receiving holes
11 valve housing
12 sealing member
13 distribution chamber
14 surrounding wall of valve housing
15 mounting flange of sealing member
16 cover
17 receiving opening
18 compensation volume
19 ventilation hole
20 inlet port
21 discharge ports
22 valve body
23 rim
24 web

What is claimed is:

1. Device for cleaning vehicle surfaces such as headlamps, comprising:
   at least one nozzle carrier for mounting on a cleaning liquid supply tube, the nozzle carrier defining at least one cleaning liquid supply conduit for a pressurized cleaning fluid and being provided with at least one cleaning fluid distribution chamber, said chamber communicating with said cleaning liquid supply conduit and with at least one spray nozzle mounted on said nozzle carrier, wherein said distribution chamber is provided with at least one inlet port which in a non-pressurized state is closed by a fluid valve and wherein said fluid valve is designed as a springless valve, wherein said valve comprises a resilient diaphragm-type sealing member, wherein the sealing member comprises a cup-shaped diaphragm provided with a peripheral mounting flange, the diaphragm defining a substantially flat sealing surface yieldingly engaging the sealing seat and being displaceable relative to the mounting flange upon the action of the fluid pressure, wherein the sealing member forms the bottom of the cleaning liquid distribution chamber, and wherein the peripheral mounting flange is held in the valve housing by a cup-shaped cover, which is snap-fitted in a receiving opening of the nozzle carrier, the cover defining a compensation volume allowing displacement of the sealing member.

2. Device according to claim 1, characterized in that the sealing member defines a valve body which in a non-pressurized condition sealingly engages a valve seat and may be disengaged from the valve seat by the pressure of the cleaning fluid.

3. Device according to claim 1, characterized in that the sealing member is designed such that it returns into its closed position by the resultant tensile forces stored within its material upon pressure release.

4. Device according to claim 1, characterized in that said distribution chamber comprises at least two cleaning fluid discharge ports each communicating with at least one spray nozzle.

5. Device according to claim 1, characterized in that at least on spray nozzle has an eye-ball design.

6. Device according to claim 1, characterized in that the spray nozzles are snap-fitted into the nozzle carrier.

7. Device according to claim 1, characterized by at least one retractable hollow cleaning liquid supply tube slidably arranged within an elongate housing connectable to a source of pressurized cleaning fluid and being biased in the retracted position, the nozzle carrier being attached to a distal end of the liquid cleaning supply tube.

* * * * *